United States Patent
Clay

(10) Patent No.: US 7,874,234 B2
(45) Date of Patent: Jan. 25, 2011

(54) LATHE WITH BRACKET MOUNTED BANJO

(76) Inventor: Tymen Clay, 4254 Perth Line 32, RR#3, Stratford, OT (CA) N5A 6S4

( * ) Notice: Subject to any disclaimer, the term of this patent is extended or adjusted under 35 U.S.C. 154(b) by 883 days.

(21) Appl. No.: 11/767,823

(22) Filed: Jun. 25, 2007

(65) Prior Publication Data

US 2008/0314211 A1 Dec. 25, 2008

(51) Int. Cl.
*B23B 17/00* (2006.01)
*B27C 7/06* (2006.01)

(52) U.S. Cl. .......................... 82/149; 82/150

(58) Field of Classification Search .................. 82/117, 82/142, 148, 150, 157; 142/49, 53
See application file for complete search history.

(56) References Cited

U.S. PATENT DOCUMENTS

| | | | | |
|---|---|---|---|---|
| 2,612,070 A | * | 9/1952 | Hoelscher | .................... 82/141 |
| 3,109,335 A | * | 11/1963 | Gerchow | .................... 82/141 |
| 3,205,780 A | * | 9/1965 | Matousek | .................. 409/118 |
| 3,491,566 A | * | 1/1970 | Hurd | ............................... 72/76 |
| 3,768,527 A | | 10/1973 | Messick | |
| 3,828,834 A | | 8/1974 | Morse | |
| 4,627,477 A | * | 12/1986 | Wise | ............................. 142/7 |
| 5,441,089 A | | 8/1995 | Lazarou | |
| 6,000,447 A | | 12/1999 | Clay | |
| 2002/0153059 A1 | | 10/2002 | Cassady, II | |
| 2003/0205290 A1 | | 11/2003 | Liao | |

* cited by examiner

*Primary Examiner*—Will Fridie, Jr.
(74) *Attorney, Agent, or Firm*—Young Basile Hanlon & MacFarlane, PC

(57) ABSTRACT

A lathe for turning a workpiece by means of a headstock and a tailstock includes a lathe bed having an elongate main support structure and bedrails extending along a side of the structure, these rails adjustably supporting the tailstock. Leg supports are provided at opposite ends of the support structure and two pivot connectors each join a respective one of the bed ends to a support leg. The bed can be pivoted about a horizontal axis extending through these pivot connectors between an upright position which can be used when the lathe user is standing and a sideways position which can be used when the user is sitting. In the upright position, the bedrails are on top of the main support structure.

20 Claims, 8 Drawing Sheets

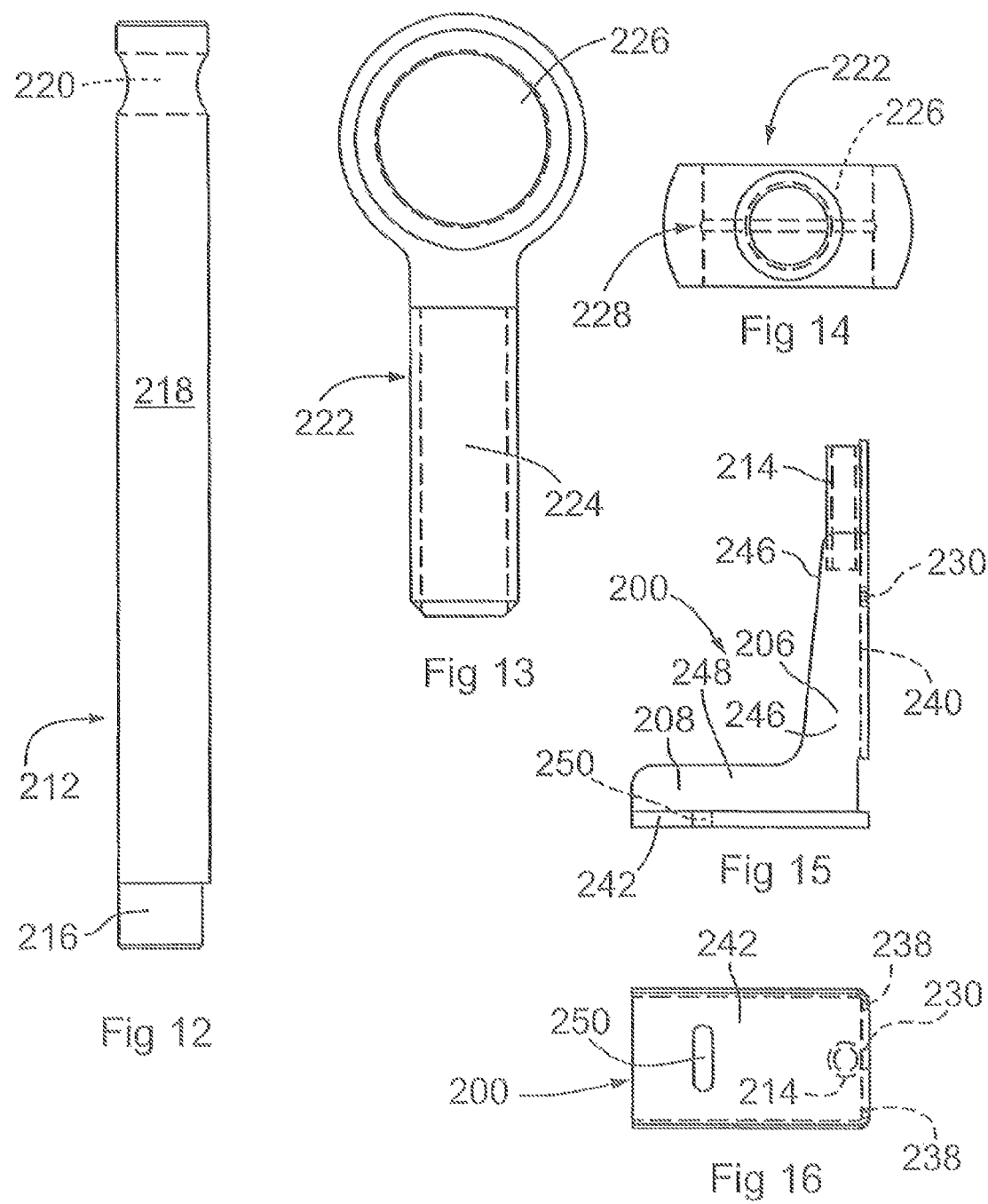

LATHE WITH BRACKET MOUNTED BANJO

This invention relates to lathes for turning a workpiece in order to carry out a lathe operation on the workplace and, in particular, relates to lathe beds for such lathes.

Lathes have been used for many years to carry out various wood turning operations in order to produce a desired product or part. A lathe can be used to rotate a workpiece (most commonly wood) which is coupled to a headstock and may also be supported by a tailstock at the end of the workpiece opposite the headstock. The workpiece is shaped by using lathe cutting tools such as handheld gouges, chisels and scrapers. Examples of products that can be produced on a lathe include stair rail and chair spindles, bowls and platters. A conventional wood lathe includes a lathe bed which can support the headstock, the tailstock and a banjo or carriage which can slide on the lathe bed. A typical lathe bed is a cast rigid box-section or girder that is supported at a suitable height by legs on opposite ends of the girder. The upper surface of the bed can be planed to provide a true working surface. This top surface of the bed can be formed by ways or elongate bed-rails. A conventional wood lathe is illustrated and described in published US application No. 2003/0205290 dated Nov. 6, 2003 and issued to Juei-Seng Liao.

U.S. Pat. No. 6,000,447 teaches a banjo toolrest which can be clamped to a lathe bed by means of a sliding cam actuated by a drive shaft. The cam is supported independently of the drive shaft by a cam block resting on a ledge formed in the base of the banjo. The cam is slidable with respect to the drive shaft. This known structure allows for sturdy clamping of the banjo.

The lathe of the present disclosure has a lathe bed with elongate bed-rails which is supported by lathe support members or legs at its opposite ends. The lathe bed has more than one position because it is mounted on the support members for pivotal movement between an upright position where the bed-rails are on top of a beam support of the lathe bed and a sideways position where these bed-rails extending along one side of the beam support. When the lathe bed is in the upright position, the lathe can be used in the normal manner with the lathe user standing and holding a lathe tool which can be supported by a toolrest. However, if the lathe bed is pivoted to the sideways position and a mounting bracket is used to support the toolrest, the lathe can be used when the user is sitting down on a chair or stool.

SUMMARY OF THE PRESENT DISCLOSURE

According to one embodiment of the present disclosure, a lathe bed apparatus for a lathe capable of turning a workpiece by means of a headstock and a tailstock includes a lathe bed having an elongate main support structure with opposite ends and elongate bed-rails extending lengthwise along a side of the support structure. The bed-rails are adapted to support the tailstock in a manner that allows the position of the tailstock on the bed-rails to be adjusted. Bed supporting members are arranged at opposite ends of the main support structure for supporting these opposite ends. Two pivot connectors each join a respective one of the opposite ends to the adjacent bed supporting member whereby the lathe bed can be pivoted about a horizontal axis extending through the pivot connectors between an upright position where the bed-rails are on top of the main support structure and a sideways position where the bed-rails extending along one side of the main support structure and are positioned one above another.

An exemplary version of this lathe bed apparatus includes a bracket for mounting a lathe toolrest mechanism, this bracket having first and second attachment sections which extend substantially perpendicular to each other. The first attachment section is adjustably mountable on the bed-rails with engagement between a planar outer surface of the first attachment section and the bed-rails. This planar outer surface extends vertically when the lathe bed is in the sideways position. The bracket in use is selectively movable to a desired position along the bed-rails.

According to another embodiment of the present disclosure, a lathe for turning a workpiece in order to carry out an operation to shape the workpiece in a desired manner includes a horizontally-extending lathe bed, including elongate bed-rails extending along and defining a bed plane and an elongate beam support having an longitudinal axis. The bed-rails are rigidly mounted on and extend along the length of the beam support. Lathe support members are arranged at opposite ends of the lathe bed and support these opposite ends. The lathe bed is pivotably mounted on the support members for pivotable movement between an upright position where the bed-rails are above the beam support and a sideways position where the bed-rails extend along one side of the beam support. The lathe further includes a drive unit mounted on the lathe bed and a headstock unit on which the workpiece can be mounted. The headstock unit is mounted on the lathe bed and has a headstock operatively connected to the drive unit so as to be rotatable by the drive unit during operation of the lathe. The lathe further includes a tailstock unit for supporting the workpiece when the workpiece is mounted on the headstock unit, this tailstock unit being mountable for selective sliding movement on the bed-rails, and a toolrest arrangement for mounting on the bed-rails intermediate the headstock and the tailstock units. The toolrest arrangement includes a toolrest member for supporting a tool during the shaping operation. This lathe can be used to carryout an operation on the workpiece when the lathe bed is either in the upright position or in the sideways position.

In an exemplary embodiment of the aforementioned lathe, the toolrest arrangement includes a banjo support and a bracket adjustably mountable on the bed-rails for slidable movement along the bed-rails. The bracket is adapted to hold the banjo support including the toolrest member and is used when the lathe bed is in the sideways position.

According to yet another embodiment of the present disclosure, a lathe for turning a workpiece in order to use a lathe tool on the workpiece includes a lathe bed having a longitudinally extending, main support structure with two opposite ends and elongate bed-fails extending along one vertically extending side of the main support structure in the longitudinal direction and parallel to one another. The bed-rails are rigidly supported by the main support structure and are positioned horizontally outwards relative to the one side of the main support structure. The lathe also has support legs arranged at and supporting the opposite ends and a headstock unit on which the workpiece can be mounted and turned, this headstock unit being mounted on the lathe bed. A tailstock unit is provided for supporting the workpiece when the workpiece is mounted on the headstock unit. The tailstock is mountable for selective sliding movement on the bed-rails. A mounting bracket arrangement for holding a toolrest is also provided and is mountable on the bed-rails between the headstock unit and the tailstock unit and the lathe includes a toolrest for mounting on the mounting bracket arrangement.

In an exemplary version of the aforementioned lathe, the mounting bracket arrangement includes a banjo for holding the tool rest and a substantially L-shaped mounting bracket having first and second arm sections which extend substantially perpendicular to each other.

These and other aspects of the disclosed lathe and lathe bed will become more readily apparent to those having ordinary skill in the art from the following detailed description taken in conjunction with the accompanying drawings.

So that those having ordinary skill in the art to which the present disclosure pertains will more readily understand how to make and use the subject invention, exemplary embodiments thereof will be described in detail herein below with reference to the accompanying drawings.

BRIEF DESCRIPTION OF THE DRAWINGS

FIG. 12 is a side view of an eccentric shaft used to adjust the position of a mounting bracket for the banjo;

FIG. 13 is a side view of an eyebolt which is connected to an of reenter end section of the shaft of FIG. 12;

FIG. 14 is an end view of the eyebolt of FIG. 13;

FIG. 15 is a side elevation of the mounting bracket used to mount the banjo in the sideways position of the lathe; and FIG. 16 is a bottom view of the mounting bracket of FIG. 15.

DETAILED DESCRIPTION OF EXEMPLARY EMBODIMENTS

Figure 1:
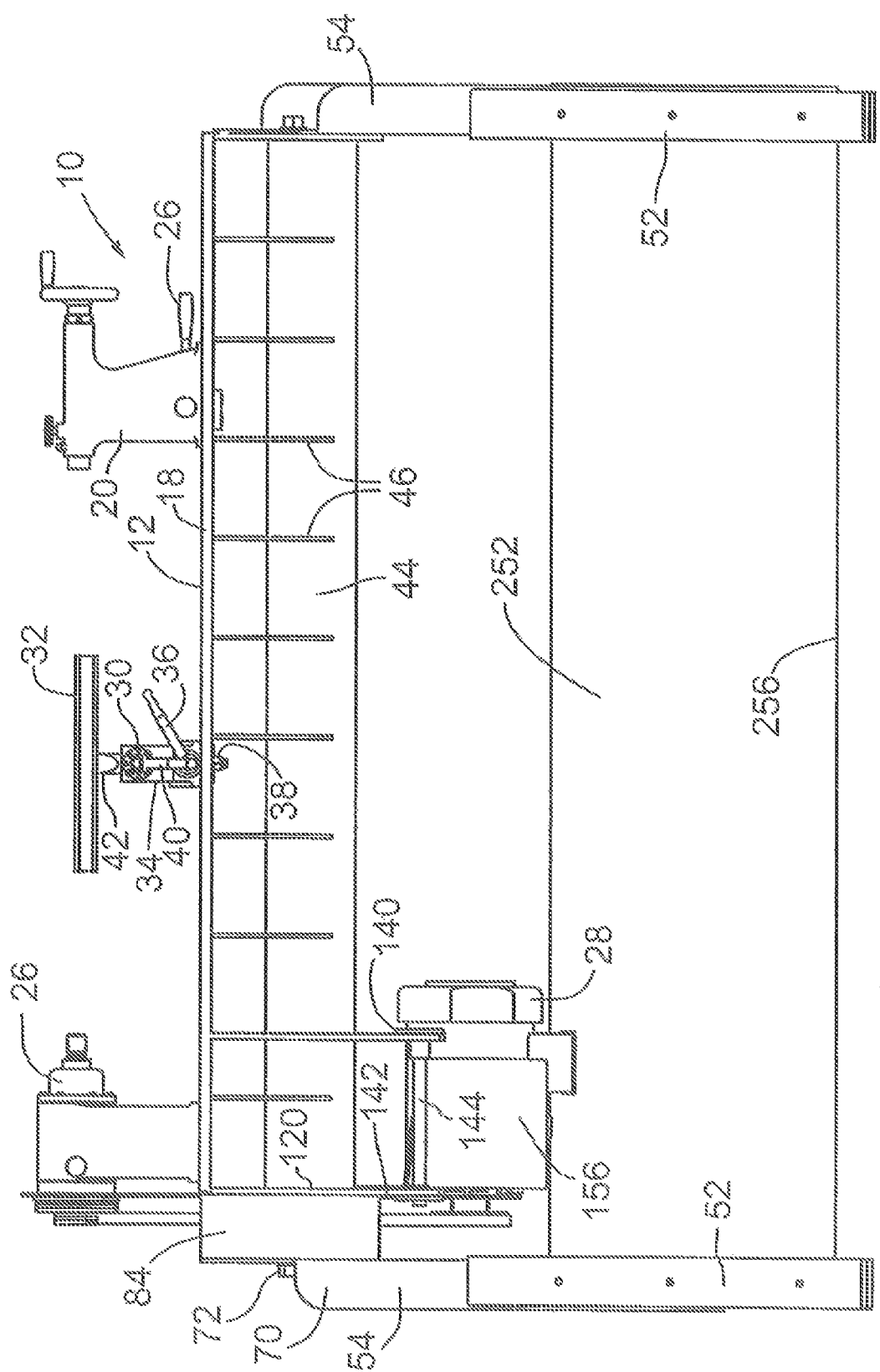
FIG. 1 is a front view of an exemplary lathe according to the present disclosure, this view showing the lathe bed in an upright position.

In the detailed description which follows, the particularly disclosed embodiment is merely illustrative of a lathe and a lathe bed according to the present disclosure and it will be appreciated by those skilled in the construction of lathes that various modifications and changes can be made to the illustrated lathe without departing from the spirit and scope of this invention. The illustrated lathe 10 is capable of turning a workpiece (not shown) such as an elongate wood member or a wood block in order to carry out an operation to shape the workpiece in a desired manner. The lathe 10 has a horizontally-extending lathe bed 12 which includes elongate bed rails 14, 16 and 18, all of which can be seen in FIG. 2. Although the exemplary lathe illustrated has three bed-rails which is advantageous for the reasons explained below, it is also possible for the lathe bed to have only two parallel bed-rails which in a known manner are used to mount a tailstock unit 20. The tailstock unit can be of standard construction and accordingly a detailed description herein is deemed unnecessary. The tailstock is used to support one end of the workpiece if such support is required for a particular turning operation. The tailstock unit is mounted for selective sliding movement on the smooth, flat surfaces 22 and 24 formed by the rails 14 and 16, these surfaces forming a bed plane. In a known manner, the tailstock can be locked to the lathe bed by a pivotable handle 26. The lathe also has a headstock unit 26 on which the workpiece can be mounted, for example at the end of the workpiece opposite the tailstock end. The headstock unit is mounted on the lathe bed 12 and is operatively connected to a drive unit indicated generally at 28 so as to be rotatable by the drive unit during operation of the lathe. Again, the construction of the headstock per se is well known in the lathe industry and accordingly a detailed description herein is deemed unnecessary.

Figure 2:
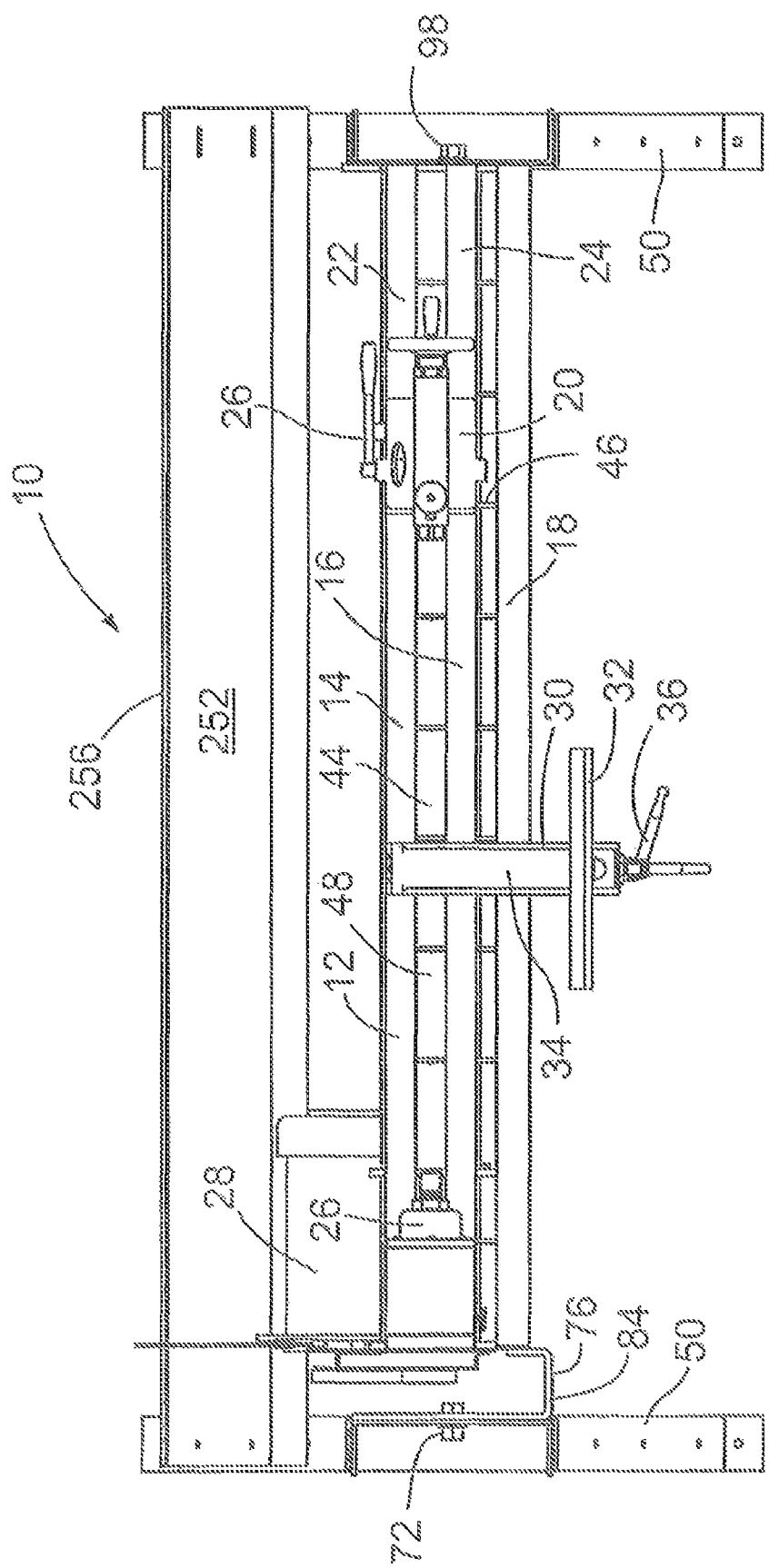
FIG. 2 is a top view of the lathe of FIG. 1, again with the lathe bed in an upright position.

Also shown in FIGS. 1 and 2 is a known type of toolrest arrangement indicated generally at 30, this arrangement being mounted on the bedrails 14, 16 intermediate the headstock and tailstock units. The toolrest arrangement includes a toolrest member 32 for supporting a lathe tool during the workplace shaping operation.

In an exemplary embodiment, the toolrest arrangement 30 can be constructed as described and illustrated in U.S. Pat. No. 6,000,447 issued Dec. 14, 1999 to Tymen Clay and the specification and drawings of this patent are incorporated herein by reference. Although a detailed description of this toolrest arrangement herein is deemed unnecessary, briefly the illustrated arrangement 10 includes a banjo or saddle 34 capable of supporting the member 32. Located at a projecting outer end of the banjo is a pivotable handle 36 which is connected to and able to turn a horizontally extending drive shaft that extends the length of the banjo and that extends through an eyebolt having a threaded lower end to which is attached a nut 38. This nut holds the bottom of a clamping plate which can be pressed against the bottom of the bed-rails by pivoting the handle 36 in order to lock the banjo in the desired position. A second handle 40 can be provided for adjusting the vertical position of a post 42 of the toolrest member.

Turning now to the construction of the illustrated lathe bed 12, this bed includes an elongate, beam support 44 which has a longitudinal axis that extends horizontally between two opposite ends of the lathe bed. Beam support 44 can also be considered the main support structure of the lathe bed and it will be appreciated that this structure should be quite rigid for operation of the lathe. The bed-rails 14, 16, 18 are rigidly mounted on and extend along the length of the beam support 44. The illustrated beam support comprises a hollow tubular member with a cylindrical exterior. The bed-rails are rigidly connected to a side of this tubular member by a series of spaced-apart ribs 46. In the illustrated embodiment there are nine of these regular ribs but it will be understood that there could fewer or more, depending to some extent on the length of the particular lathe. Each rib can be arc-shaped at one end so as to match the curvature of the tubular member and each rib can be welded to the tubular member as well as to the bed-rails. Also, each rib can be formed with a rectangular cut-out in the end adjacent the rails to accommodate the clamping plates and attachment mechanism for both the banjo and the tailstock, this cut-out being located in the region of an elongate slot 48 formed between the bed-rails 14, 16. In one exemplary embodiment, the tubular member forming beam support 44 has an external diameter of about 4.5 inches.

Lathe support members or support legs 50 are arranged at and support the opposite ends of the lathe bed. In the illustrated embodiment, each support leg includes a lower leg member 52 which can have the shape of a truncated triangle with a wide base. In addition, each support leg has an upper leg section 54. Both the lower leg member and the upper leg section can be provided with two rows of fastener holes, these rows being parallel and vertical. The two rows of holes 56 in the lower leg member are visible in FIGS. 3 and 4 as are the holes 58 in the upper leg section. It will be understood that the provision of these holes allow each lower leg member to be attached to its respective upper leg section 54 by means of two or more nut and bolt combinations. Depending on the holes selected, the height of each support leg can be adjusted and, generally speaking, these support legs are adjusted so that the height of the lathe bed is appropriate for the use of the lathe 10 by a user who is standing on the front side of the lathe. A standing user of the lathe uses the lathe in the upright position shown in FIGS. 1 and 2, that is, with the tailstock unit and the headstock unit projecting upwardly from the lathe bed.

The illustrated lower leg member is formed with two outwardly projecting edge flanges 60 which can be formed with fastener holes 62 distributed along the length of the flange. In addition, each leg member 52 has a horizontal foot plate 64 attached thereto and, if desired, there can be two rectangular foot pads 66 mounted at opposite ends of and on the bottom side of the foot plate 64. In one exemplary embodiment of the lathe, the overall height of lower leg member 52 is about 20½ inches and the total width of this leg member at its base is 28 inches. A hole 68 can be formed at each leg member 52 if desired to reduce its weight and the amount of material required. The upper leg section 54 is provided with two edge flanges 70 located on opposite sides thereof and extending vertically. The upper end of the leg section can have a semicircular shape and near this upper end and centered on the leg section is a hole for receiving a pivot member which can take the form of a standard bolt onto which is threaded a nut 72. Washers can also be provided on this bolt. Formed in the upper end of the leg section 54 is a bolt receiving slot 82 having a center of curvature corresponding to the center of the hole for the pivot member, this slot extending through an arc of about 90 degrees. In one embodiment, the slot has an inner radius of 3.32 inches and a slot width of 0.43 inch. This slot controls the range of pivotal movement of the lathe bed. The bottom end of the leg section 54 can be formed with a cut-out 74. In one embodiment of the leg section 54, the width of the leg section is 9 inches and its overall height is 26.5 inches. Also, the hole in the upper end of the leg section for receiving the pivot bolt is 0.64 inch, capable of receiving a ⅝ inch bolt.

Mounted on the upper end of the leg section 54 at the drive unit end of the lathe is a swivel bracket 76 having a U-shaped bottom section 77 having two bolt receiving holes 78. If desired, a series of holes can be provided in order to allow adjustment of the position of the lathe bed on the bracket. If the desired position of the lathe bed relative to the bracket and the leg supports is known prior to the construction of the lathe, then two holes 78 will suffice. The provision of a series of holes 78 arranged in a row can be advantageous as it permits future adjustments to the lathe bed support, for example, to accommodate the weight of a larger drive motor for the lathe. The bracket 76 is formed with a central bolt receiving hole 80 through which the aforementioned pivot bolt can extend to pivotably connect the bracket to an upper end section of the support leg. The upper end of the bracket has a semi-circular shape which, in one embodiment, has a radius of 4.5 inches. Formed near the upper end of the bracket is a bolt receiving hole 83. It will be understood that an adjustment bolt extends through the slot 82 and through the hole 83 in the bracket. By means of a nut, which can be a wing nut, this bolt can be secured in place and tightened for the purpose of securing bracket 76 in either a first position shown in FIGS. 1 and 2 wherein the planar end surface 84 of the bracket extends vertically or a second position illustrated in FIG. 3 wherein this end surface extends horizontally.

Figure 7:
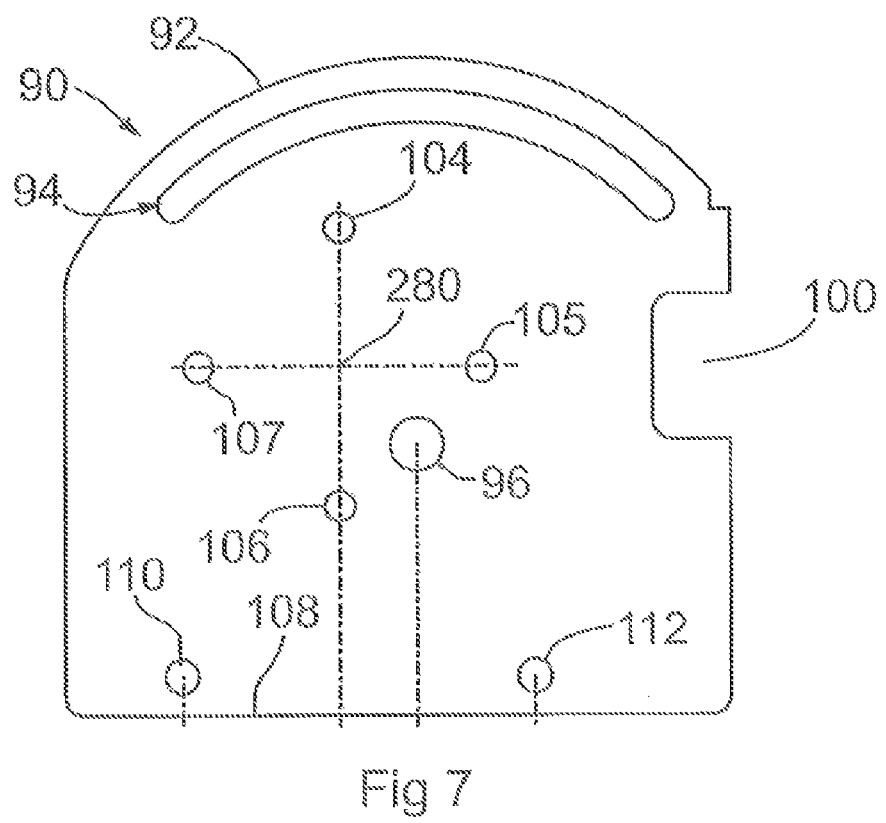
FIG. 7 is a side view of an end plate provided at the right end of the lathe bed shown in FIG. 1.

The manner in which the tailstock end of the beam support 44 is pivotably mounted will now be described. Attached to the tailstock end of the beam support is an end plate 90 which is shown separately in FIG. 7. As shown in FIG. 7, this end plate has a rounded top end 92 and located close to this top end is an arc-shaped slot 94. Both the top end and the slot have a center of curvature located at the center of a pivot hole 96 located approximately at the center of the end plate. It will be understood that a pivot bolt extends through the hole 96 and is secured in place by a nut 98 visible in FIG. 2. A suitable washer can be provided on the pivot bolt adjacent to the nut. A rectangular recess 100 is provided on one side edge of the end plate and two corresponding recesses 102, 103 are provided near the top end of the leg section 54 at this end of the lathe. It will be understood that the recess 100 can be aligned with either the recess 102 or the top-edge recess 103 of the leg support. Aligning the recess 100 with either the side edge recess 102 or the recess 103 allows both the removal of the tailstock unit and the banjo 34 by sliding these devices horizontally on the bed-rails and through the recesses. There can optionally be formed in the end plate four additional holes 104 to 107 which are simply providing to assist the welding of this end plate to the tubular support beam. Two of these holes are aligned vertically and the other two holes are aligned horizontally. There can also be formed near a straight end 108 of the end plate, two optional holes 110 and 112 which can assist in the welding of this end plate.

Figure 4:
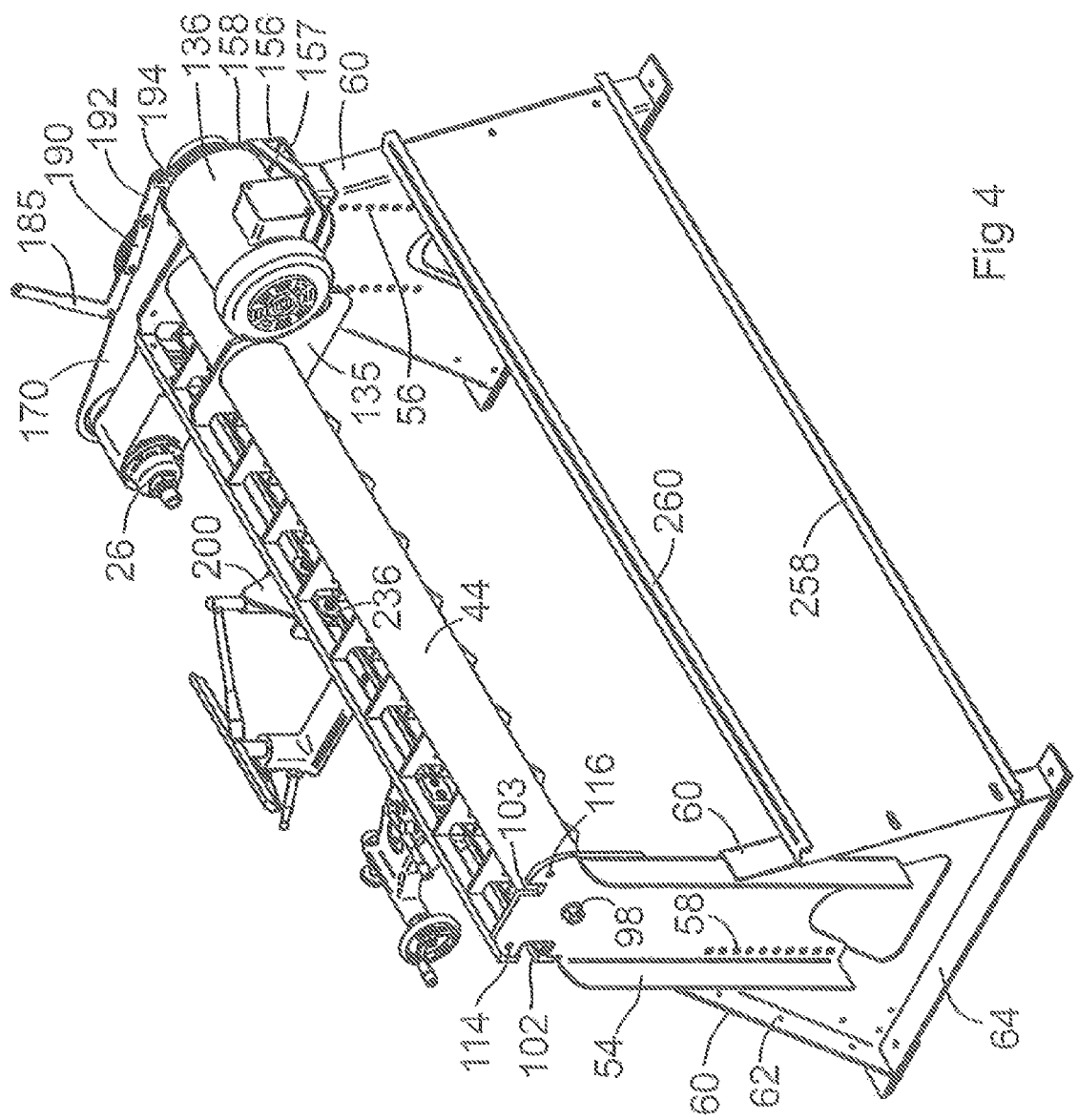
FIG. 4 is another perspective view of the lathe of FIGS. 1 to 3, this view being taken from above and from the rear and again showing the lathe bed in the sideways position.

The end plate 90 can be secured in the desired position relative to the adjacent leg support by means of one or two nut and bolt combinations with each bolt extending through the slot 94 and one of two bolt holes 114 and 116 shown in FIG. 4. Thus, the tailstock end of the lathe bed is secured in the desired position by the tightening of at least two bolts including the pivot bolt held by nut 98.

Figure 8:
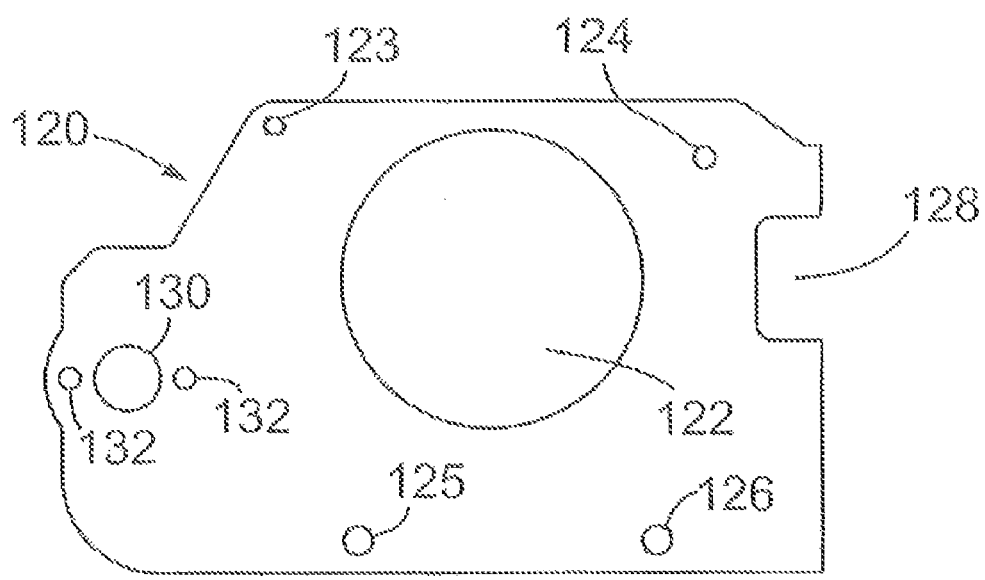
FIG. 8 is a side view of another end plate of the lathe bed, this end plate being attached to the left end of the lathe bed as shown in FIG. 1.

FIG. 8 illustrates an end plate 120 which is welded to the headstock end of the beam support 44. This plate, which in one embodiment has a thickness of 0.31 inch is formed with a relatively large, circular hole 122 which receives the end of the tubular beam support before the plate is welded thereto. In a particular embodiment, the diameter of this hole is 4.55 inches. There can optionally be distributed around this hole four smaller holes indicated at 123 to 126. Again, the two upper holes 123, 124 are simply provided to assist in the welding of the end plate to the adjacent members of the lathe bed. A rectangular recess 128 can be provided along one side edge and it will be understood that the ends of the three bed-rails 14, 16 and 18 are welded, to this side edge. Near the side edge opposite the recess 128 is formed a further circular hole 130 which in one embodiment has a diameter of 1 inch and this hole is centered between two smaller fastener holes 132 which in one embodiment have a diameter of 0.33 inch. It will be understood that the end plate 120 and a similar plate 135 (see FIG. 4) are used to mount an electric drive motor 136 which is part of the drive unit for the headstock of the lathe. In one embodiment, the drive motor is a one horsepower motor having a weight of approximately 30 pounds.

Figures 10, 11:
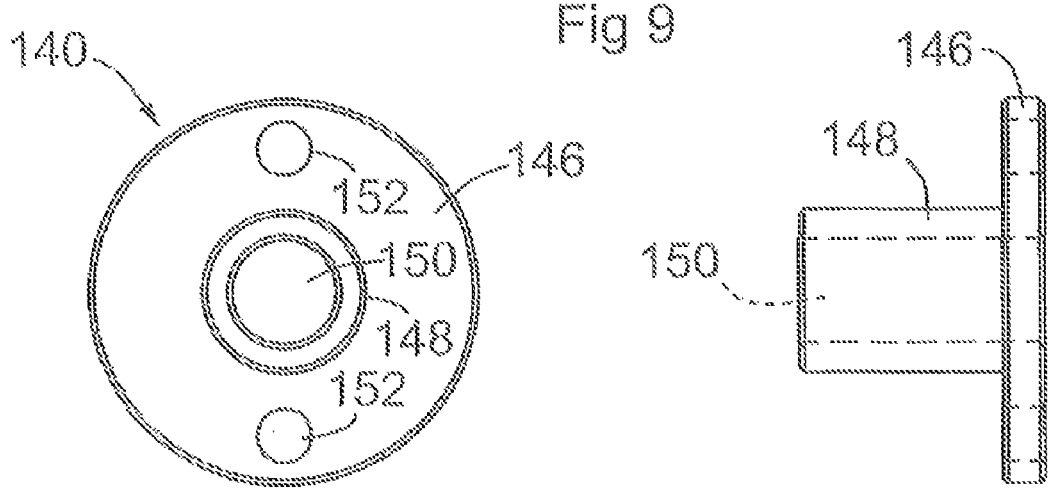
FIG. 10 is an end view of one of two motor mounting bushings used to mount the drive motor for the lathe.
FIG. 11 is a side view of the bushing of FIG. 10.

FIGS. 10 and 11 show the longer of two motor mounting bushings used to pivotably mount the motor 136 on the end plate 120 and the similar plate 135. The longer bushing 140 can be mounted in the plate 135 as can be seen in FIG. 1. The shorter bushing in the plate 120 is indicated at 142 in FIG. 1. Between these two bushings extends a straight shaft 144 which is free to pivot. Each of these bushings has a relatively flat head section 146 at one end and a hollow cylindrical section 148 which can be integrally connected to the head section. In one embodiment, the head section has a diameter of 2.35 inches while the cylindrical section has a diameter slightly less than 1 inch. In this embodiment, the longer bushing 140 has a total length of 1.5 inches while the shorter bushing has a length of 0.75 inch. Each bushing is formed with two fastener holes 152 formed in the head section and these holes can be used to secure the bushing to the adjacent plate 120 or 135 by means of a suitable fastener such as a nut and bolt combination. A bent motor mounting plate 156 is rigidly connected to the shaft such as by welding. In the position of the motor shown in FIG. 4, the plate 156 has a vertically extending section 158 and a horizontally extending section. The two sections are secured together by a brace member 157. The motor is detachably connected to the plate 158. The vertical section 158 has an opening (not shown) through which the drive shaft of the motor extends to a belt pulley 160 around which extends a flexible drive belt 162. This drive belt extends around a driven pulley 164 of the headstock.

Figure 9:
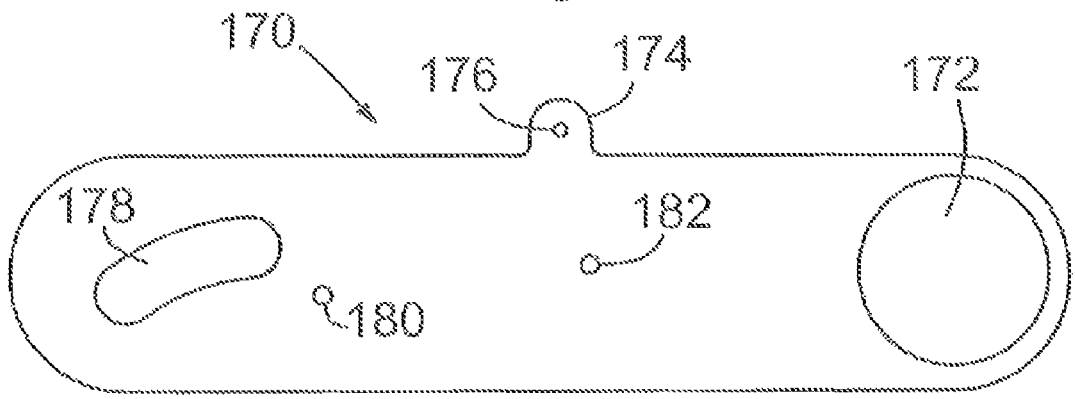
FIG. 9 is a side view of an elongate back plate used to cover one side of a drive belt.

Shown in FIG. 9 separately is an elongate back plate 170 which functions as a belt cover on the motor side of the drive belt 162. The plate 170 has a circular opening 172 at one end, this being the end to which the headstock unit 26 is connected. The shaft of the headstock on which the pulley 164 is mounted extends through this hole which, in one embodiment, has a radius of approximately 2⅝ inches. Located approximately midway along the length of the plate is a projecting tab 174 hewing a pivot hole 176. An arc-shaped slot 178 is formed in the end of the plate opposite the opening 172. The shaft of the pulley 160 extends through this slot which, in one embodiment, has an inside radius of 4.64 inches and an outer radius of 6.14 inches so that the slot width is about 1.5 inches. A couple of additional fastener holes 180 and 182 can be provided as well in the plate 170 and these are used to bolt the plate 170 to the end plate 120. In particular, the hole 180 is aligned with the hole 125 in the end plate and similarly the hole 182 is aligned with the hole 126 in order to bolt the two plates together securely.

In order to permit the drive motor 136 to be pivoted in order to replace or remove the drive belt, a substantially L-shaped handle 185 is provided and is pivotably attached by a pivot pin or bolt to the tab 174 on plate 170. The handle can include a straight handle section 186 which is integrally connected to a lever section 188 which, in one embodiment, extends at a 70 degree angle to the handle section. Pivotably connected to the fever section is an interconnecting link 190 which in one embodiment has a length of 4.75 inches and a distance between its two pivot pins holes of 3.75 inches. This link or link arm is pivotably connected to a link adjuster 192 which in turn is pivotably connected to a tab 194 which is formed on the motor mounting plate 156. The member 192 can be formed with a short longitudinally extending slot at the end furthest from the tab 194. This slot, which in one embodiment has a total length of only 1.32 inches is optionally provided for an adjustment capability. It will be appreciated that by pulling on the handle 185 in the direction of the headstock, the motor 136 can be pivoted from its normal working position so as to provide substantial slack in the drive belt 162, allowing removal of same. The pivotal movement is further permitted by the aforementioned slot 178 which also limits the amount of pivotal movement of the motor.

When the lathe 10 is used in the upright position as shown in FIGS. 1 and 2, the lathe can be used by the operator in a normal manner with a known form of banjo 34 mounted on the bed-rails between the headstock and the tailstock. However, this normal toolrest arrangement is not suitable when the lathe bed has been pivoted to the sideways position shown in FIGS. 3 and 4 where the bed-rails extending along one side of the beam support 44, that is, where the bed-rails are arranged one above another and define a bed plane which is in a vertical plane. This sideways position which is particularly suitable for a user who is sitting on a chair or stool requires a different way to support the toolrest. In particular, for purposes of a sideways oriented lathe bed, the toolrest arrangement includes a mounting bracket indicated generally at 200, this bracket being adjustably mountable on the bed-rails for selective slid able movement along the bed-rails. As shown, this bracket can be adapted to hold a banjo support 202 which can be the same as or similar to the aforementioned banjo 34. In practice and in order to make the lathe 10 easier to use, two banjos 34, 202 can be provided with the lathe 10, one for use on the lathe when the lathe bed is in the upright position and the other for use on the mounting bracket 200. As shown, the banjo support includes a toolrest member 204 which is adjustably mounted on the banjo in a manner similar to the toolrest mounted on the banjo 34.

The illustrated embodiment of the mounting bracket is substantially L-shaped and has first and second rigid arm sections 206 and 208 which extend substantially perpendicular to each other. By shaping the bracket in this manner, it does not interfere with the turning of the workpiece which extends between the headstock and the tailstock. The first arm section is adjustably mounted on the bed-rails 14, 16. Any adjustment in the position of the bracket along the bed-rails is carried out by pivoting a handle 210 which is attached to the top end of a vertical eccentric shaft 212 that extends through a sleeve 214. This sleeve is welded to the outer side of first arm section 206. In one particular embodiment, the sleeve or pipe 214 has a length of 4 inches and an internal diameter of about ¾ inch. Illustrated separately in FIG. 12 is the shaft 212 which has an offset cylindrical end section 216. In one embodiment, the total length of the shaft is 7.5 inches and it has a main section 218 with a diameter of ¾ inch. The offset of the cylindrical section 216 is 0.031 inch from the longitudinal centerline of section 218. A hole 220 is formed in the top end of the shaft to receive the end of handle 210 and preferably the centerline of this hole is aligned with the direction of the offset. Mounted on the offset cylindrical section 216 is an eyebolt 222 shown separately in FIGS. 13 and 14 and shown mounted at the end of the shaft in FIG. 3. This eyebolt has a threaded shank 224 and is formed with a hole 226 for receiving the offset cylindrical section 216 in a snug fitting manner. A groove 228 having a slightly larger diameter than the hole 226 can be formed midway along the length of the hole. This groove is to hold grease used to lubricate the eyebolt.

Figure 5:
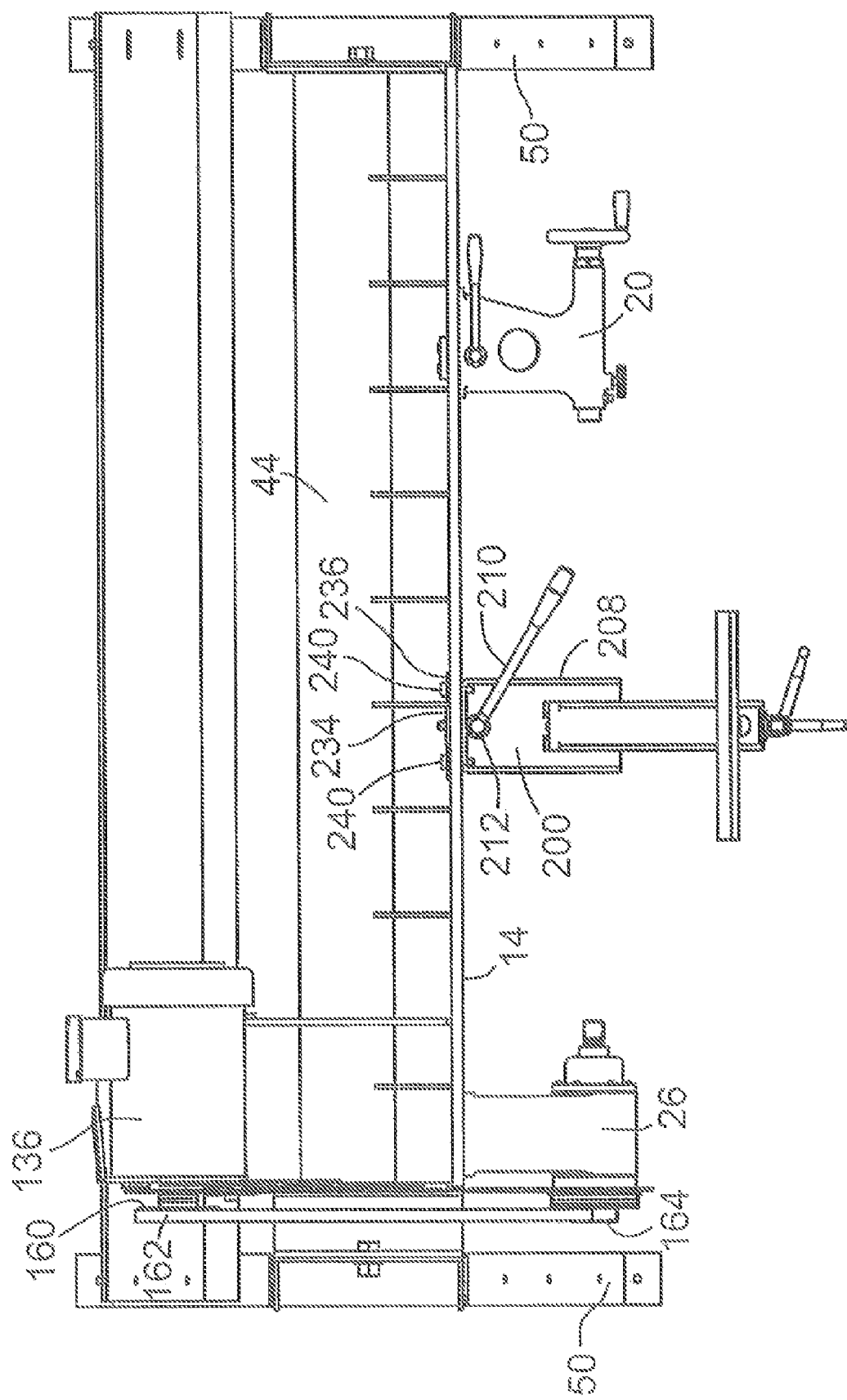
FIG. 5 is a top view of the lathe of FIG. 1 with the lathe bed shown in the sideways position.
Figure 6:
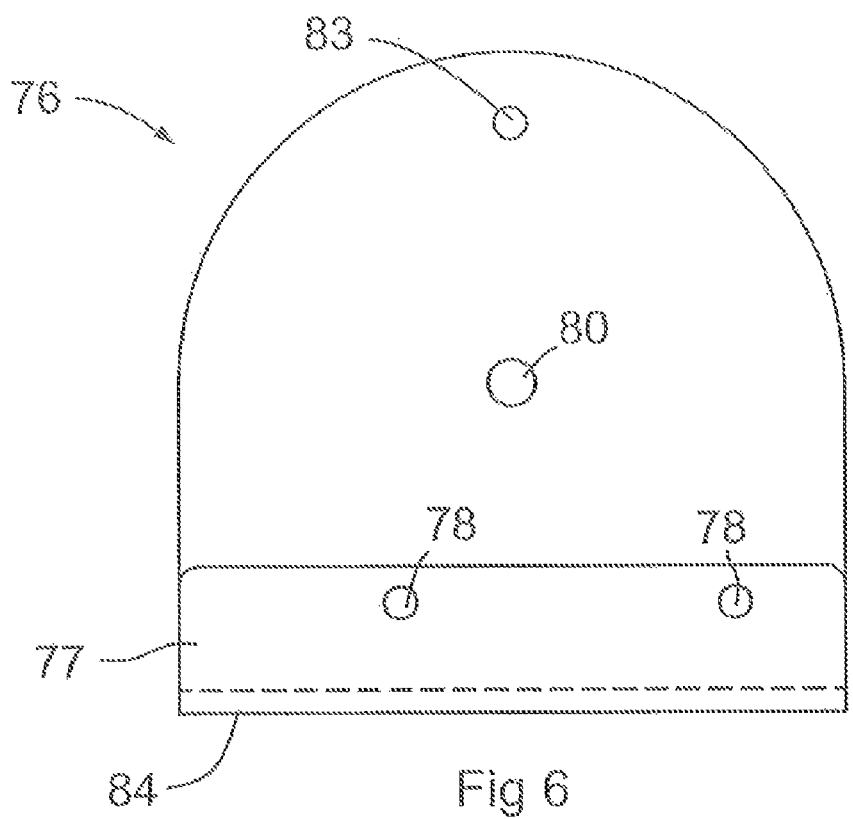
FIG. 6 is a side view of a pivotable bracket used to pivotably connect the left end of the lathe bed to an adjacent support leg.

Shown separately in FIGS. 15 and 16 is the mounting bracket 200 which has a hole 230 through which the eyebolt 222 extends. The eyebolt extends through a sliding "T" nut or "T" plate 234 visible in FIG. 5. A nut can be threaded onto the end of the eyebolt to hold the T-nut in place and clamp its opposite edge flanges to the adjacent bed-rails. If desired, there can also be provided on opposite sides of the T-nut two plastic sliders 236, each of which fits in the slot between the adjacent bed-rails. Two bolt holes can be provided at 238 in the first section of the mounting bracket, these holes being aligned horizontally with the hole 230 and used to detachably connect the plastic sliders 236 to the mounting bracket by means of bolt and nut combinations 240. The sliders 236 can be made of ultra high molecular weight plastic (UHMW)

which has a low coefficient of friction and each slider can either be rectangular or can have a circular shape as shown in FIG. 4.

Figure 3:
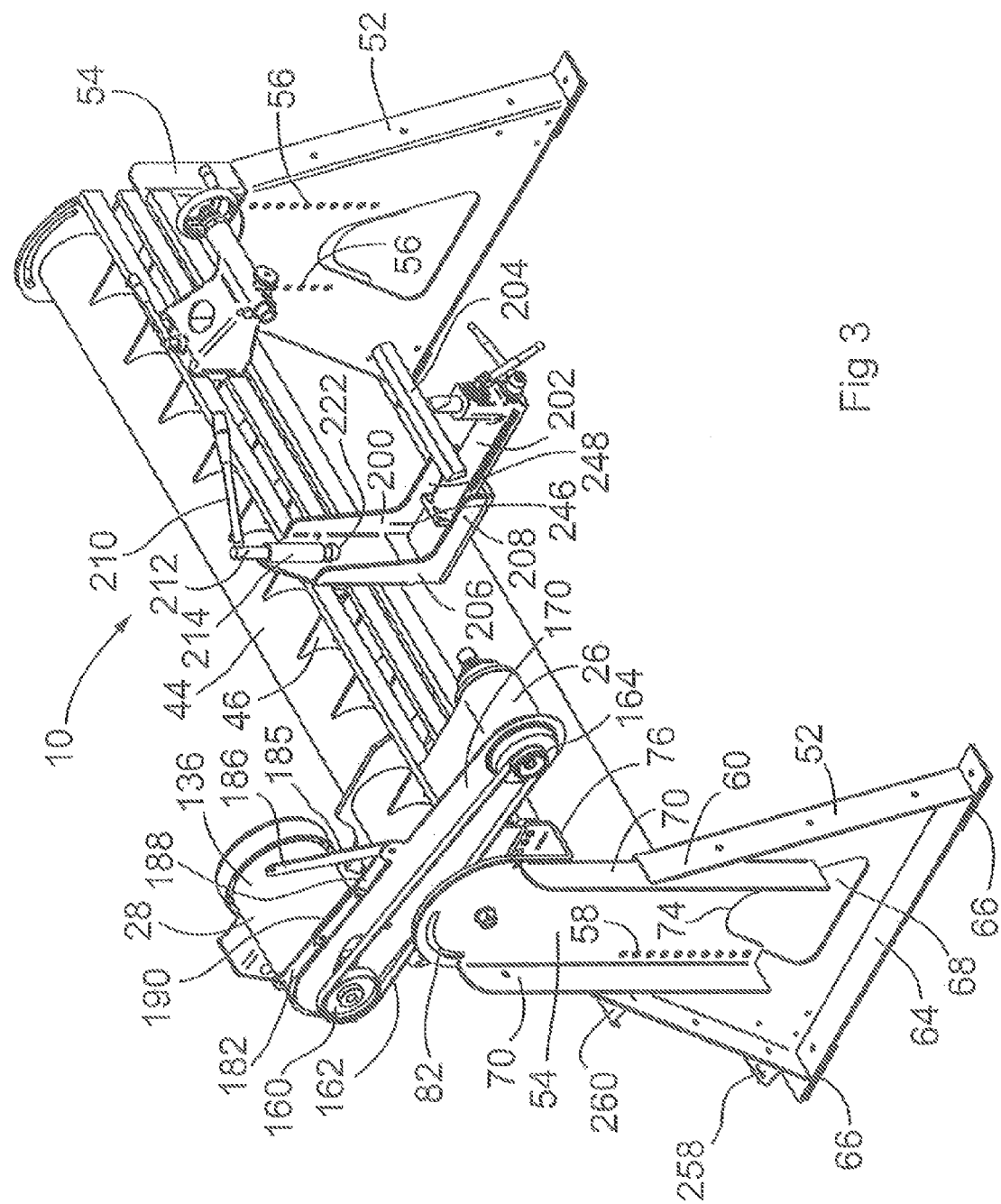
FIG. 3 is a perspective view of the lathe of FIG. 1, this view being taken from above and from the left end and showing the lathe bed pivoted to a sideways position.

Returning to the construction of the mounting bracket 200, in order to give it desirable rigidity, its first and second arm sections 206 and 208 are channel-shaped with a planar, interconnecting central portion 240 and 242 and two edge flanges 246 and 248 joined to their respective central portions. As shown in FIG. 3, during use of the mounting bracket, the flanges 246 of the first arm section project outwardly from the bed-rails and the flanges 248 of the second arm section project upwardly.

The aforementioned interconnecting central portion 242 can be provided by a separate plate member welded to the two bottom edges of the remaining portion. This bottom or base portion in the preferred embodiment has a transverse slot 250 formed therein for passage of a bolt, preferably an eyebolt, which adjustably connects the banjo support 202 to the second arm section 208. The provision of the slot 250 permits the banjo support to be adjusted on the mounting bracket to place it in a desired position for lathe operation.

An optional, desirable feature shown in FIG. 1 is the provision of a rectangular leg brace 252 which can be formed of fourteen or sixteen gauge sheet metal with channel-shaped flanges formed on its opposite longitudinal edges 254, 256. The channel-shaped edge sections 258, 260 are visible in FIGS. 3 and 4 and they provide rigidity to this leg brace. The leg brace can be attached by bolt and nut combinations or screws to the flanges 60.

In an exemplary embodiment of the lathe 10, the lathe bed 12 is mounted on its lathe supports in a manner which makes it relatively easy for the user to pivot the lathe bed and the attached units between the upright position and the sideways position. This is accomplished in the illustrated embodiment of the lathe in a different manner at the two opposite ends of the beam support 44. In the case of the headstock end, an adjustment of the center of gravity of the combination that includes the lathe bed, the headstock unit, the tailstock unit and the drive unit, is made by the point of attachment between the end plate 120 and the swivel bracket 76. At the tailstock end of the lathe, the longitudinal centerline of the beam support 44 extends through a center point 280 (see the end plate 90 in FIG. 7) which is offset horizontally and vertically from the hole 96 through which the pivot bolt extends. It will thus be seen that in this manner, each pivot member or pivot bolt extends through its respective hole at a location where it is spaced away from the central longitudinal axis of the beam support 44. This offset or mounting of the pivot members or pivot bolts locates the pivot members close to or at the center of gravity of the aforementioned combination which includes the lathe bed 12, the headstock unit, the tailstock unit and the drive unit, the latter being quite heavy as indicated. Moreover, this relationship of the center of gravity to the central longitudinal axis of the beam support is true whether the lathe bed is in its upright position or in its sideways position.

The third bed-rail 18 is quite advantageous when using the mounting bracket 200 which desirably provides a very rigid support for the banjo and the toolrest mounted on the banjo. This third bed-rail extends parallel to the other two bed-rails and can be spaced apart from the bed-rail 16, if desired. Because of the location of the third bed-rail, it provides additional rigid support for the mounting bracket 200 during use thereof.

It will be appreciated by one skilled in the lathe art that it is possible to construct a variation of the lathe illustrated in FIGS. 3 and 4 wherein the lathe bed is fixedly mounted in the sideways position illustrated in FIGS. 3 and 4, that is, where the lathe bed is not pivotal about a horizontal axis. Such a lathe can be useful to a person who wishes to use a lathe in a sitting position, that is, sitting on a chair or stool and who may not wish to use a lathe while standing up. Such a lathe could be advantageous for such a user as it is easier and less expensive to construct than the illustrated pivoting lathe but it has the disadvantage of not being pivotable to an upright position so that the user can also carry out a lathe operation while standing.

In one particular embodiment of the pivoting lathe 10, the lathe bed has a length of 4.5 feet, and the height of the pivot bolts for the lathe bed is 2 feet 5 inches.

It will be readily apparent to those skilled in the lathe art that various modifications and changes can be made to the described and illustrated lathe without departing from the spirit and scope of this invention. Accordingly, all such embodiments and variations as fall within the scope of the appended claims are to be included in and considered part of this invention.

The invention claimed is:

1. A lathe for turning a workpiece in order to carry out an operation to shape said workpiece in a desired manner,
a horizontally-extending lathe bed including elongate, rigid bed-rails extending along an elongate beam support having a longitudinal axis, said bed-rails being provided on and extending along the length of said beam support;
lathe support members arranged at opposite ends of said lathe bed and supporting said opposite ends, said lathe bed being pivotally mounted on said support members for pivotal movement between an upright position where said bed-rails are on top of said beam support and a sideways position where said bed-rails extend along one side of said beam support;
a drive unit mounted on said lathe bed;
a headstock unit on which said workpiece can be mounted, said headstock unit being mounted on said lathe bed and having a headstock connective to said drive unit so as to be rotatable by said drive unit during operation of said lathe;
a tailstock unit for supporting said workpiece when said workpiece is mounted on the headstock unit, said tailstock unit being mountable for selective sliding movement on said bed-rails; and
a toolrest arrangement for mounting on said bed-rails intermediate said headstock and tailstock units, said toolrest arrangement including a toolrest member for supporting a lathe tool during said shaping operation,
wherein said lathe can be used to carry out a lathe operation on said workpiece when said lathe bed is either in said upright position or in said sideways position.

2. A lathe according to claim 1 wherein said toolrest arrangement includes a banjo support and a mounting bracket adjustably mountable on said bed-rails for selective slidable movement along said bed-rails, said bracket being adapted to hold said banjo support including said toolrest member and being usable when said lathe bed is in said sideways position.

3. A lathe according to claim 2 wherein said mounting bracket is substantially L-shaped and has first and second rigid arm sections which extend substantially perpendicular to each other, said first arm section being adjustably mountable on said bed-rails and having a first arm length that extends vertically and perpendicular to the length of said bed-rails and said second arm section during use of the mounting bracket, having a second arm length that extends substantially horizontally, said banjo support being adjustably mounted on said second arm section.

4. A lathe according to claim 2 wherein said lathe bed has three of said bed-rails which are parallel to one another and spaced apart from each other, said tailstock unit and said mounting bracket are both mountable for selective sliding movement on a first and a second of said bed-rails, and a third of said bed-rails is located below the first and second bed-rails when said lathe bed is in said sideways position and provides additional rigid support for said mounting bracket during use thereof.

5. A lathe according to claim 1 wherein said beam support comprises a hollow tubular member and said bed-rails are rigidly connected to a side of said tubular member by a series of spaced-apart ribs distributed along said tubular member and welded thereto.

6. A lathe according to claim 2 wherein said drive unit includes an electric motor mounted on one end of said beam support by means of a motor mounting plate, which is pivotally connected to said one end of said beam support, and wherein said drive unit and said motor mounting plate are pivotable with the lathe bed between said upright and sideways positions.

7. A lathe according to claim 1 wherein opposite ends of said beam support are each pivotally connected to a respective one of said lathe support members by means of a pivot member extending through a hole formed in a respective mounting plate of the beam support and spaced away from a central longitudinal axis of the beam support, whereby the offcenter mounting of the pivot members locates the pivot members close to or at the center of gravity of a combination that includes said lathe bed, said headstock unit, said tailstock unit, and said drive unit, whether said lathe bed is in its upright position or in its sideways position.

8. A lathe according to claim 3 wherein each of said first and second arm sections is channel shaped with a planar, interconnecting central portion and two edge flanges joined to the central portion and, during use of said mounting bracket, the flanges on said first arm section project outwardly away from said bed-rails and the flanges on said second arm section project upwardly.

9. A lathe according to claim 3 wherein said second arm section is channel shaped with a planar, bottom portion that extends substantially horizontally during use of the mounting bracket and has a transverse slot formed therein for passage of a bolt adjustably connecting said banjo support to said second arm section.

10. A lathe bed apparatus for a lathe capable of turning a workpiece by means of a headstock and a tailstock, said lathe bed apparatus comprising:
a lathe bed having an elongate main support structure with opposite ends and elongate bed-rails extending lengthwise along a side of said support structure, said bed-rails being adapted to support said tailstock in a manner that allows the position of the tailstock on the bed-rails to be adjusted;
bed supporting members arranged at said opposite ends of the main support structure for supporting said opposite ends; and
two pivot connectors each joining a respective one of said opposite ends to the adjacent bed supporting members whereby said lathe bed can be pivoted about a horizontal axis extending through said pivot connectors between an upright position where said bed-rails are on top of said main support structure and a sideways position where said bed-rails extend along one side of said main support structure and are positioned one above another.

11. A lathe bed apparatus according to claim 10 including a bracket for mounting a lathe toolrest mechanism, said bracket having first and second attachment sections which extend substantially perpendicular to each other, said first attachment section being adjustably-mountable on said bed-rails with engagement between a planar outer surface of said first attachment section and said bed-rails, said planar outer surface extending vertically when said lathe bed is in said sideways position, said bracket on use being selectively movable to a desired position along said bed-rails, and wherein said second attachment section is adapted for adjustably mounting said lathe toolrest mechanism.

12. A lathe bed apparatus according to claim 11 wherein said lathe bed has three of said bed-rails which are parallel to one another, a first and a second of said bed-rails being spaced apart so as to form an elongate gap between them for adjustably mounting said tailstock and said bracket on the first and second bed-rails, and wherein a third of said bed-rails is located below the first and second bed-rails when said lathe bed is in said sideways position and provides additional rigid support for the bracket during use thereof.

13. A lathe bed apparatus according to claim 10 wherein said main support structure comprises an elongate, hollow tubular member and said bed-rails are rigidly connected to a side of the tubular member by a series of spaced-apart ribs distributed along said tubular member and welded thereto.

14. A lathe bed apparatus according to claim 10 including a motor mounting arrangement at one end of said main support structure, said motor mounting arrangement including a motor mounting plate pivotable with said lathe bed between the upright position and the sideways position so that, during use of the lathe with a drive motor for the headstock mounted on said motor mounting plate, said drive motor is able to pivot with the lathe bed.

15. A lathe bed apparatus according to claim 10 wherein each pivot connector extends through a hole formed in a respective plate and spaced away from a central longitudinal axis of said main support structure, whereby the off center mounting of the pivot connectors locates the pivot connectors close to or at the center of gravity of a combination including said lathe bed, said headstock, said tailstock and a drive unit for rotating said headstock, whether said lathe bed is in its upright position or in its sideways position.

16. A lathe for turning a workpiece in order to use a lathe tool on said workpiece, said lathe comprising;
a lathe bed having a longitudinally extending, main support structure with two opposite ends and elongate bed-rails extending alone one vertically extending side of said main support structure in the longitudinal direction and parallel to one another, said bed-rails being rigidly supported by said main support structure and positioned horizontally outwards relative to said one side of the main support structure;
lathe support legs arranged at and supporting said opposite ends;
a headstock unit on which said workpiece can be mounted and turned, said headstock unit being mounted on said lathe bed;
a tailstock unit for supporting said workpiece when said workpiece is mounted on said headstock unit, said tailstock being mountable for selective sliding movement on said bed-rails;
a mounting bracket arrangement for holding a toolrest mountable on said bed-rails between the headstock unit and the tailstock unit, and
a toolrest for mounting on said mounting bracket arrangement.

17. A lathe according to claim 16 wherein said mounting bracket arrangement includes a banjo for holding said toolrest and a substantially L-shaped mounting bracket having first and second arm sections which extend substantially perpendicular to each other, said first arm section having a planar, vertical surface engageable with said bed-rails and being adjustably connected to said bed-rails, and said second arm section during use of the mounting bracket arrangement extending substantially horizontally away from said main support structure and adjustably supporting said banjo which is mounted thereon.

18. A lathe according to claim 16 wherein said lathe bed is mounted on said support legs for pivotal movement about a horizontal pivot axis extending longitudinally relative to said main support structure, said lathe bed together with said headstock unit and said tailstock unit being selectively pivotable between a sideways position where said bed-rails are positioned horizontally outwards from the main support structure and an upright position where said bed-rails are on top of said main support structure.

19. A lathe according to claim 16 wherein said lathe bed has three of said bed-rails which are parallel to one another and spaced-apart from each other, said tailstock unit and said mounting bracket arrangement are both mountable on a first and a second of said bed-rails, and a third of said bed-rails is located below the first and section bed-rails and provides additional rigid support for said mounting bracket arrangement.

20. A lathe according to claim 18 wherein said main support structure is an elongate, hollow, tubular member and said bed-rails are rigidly connected to said tubular member by a series of spaced-apart ribs distributed along the length of said tubular member.

* * * * *